Dec. 11, 1962     H. J. GALBRAITH     3,068,385
COMBINATION SYNCHRO MOTOR AND TORQUE MEASURING DEVICE
Filed Sept. 13, 1960
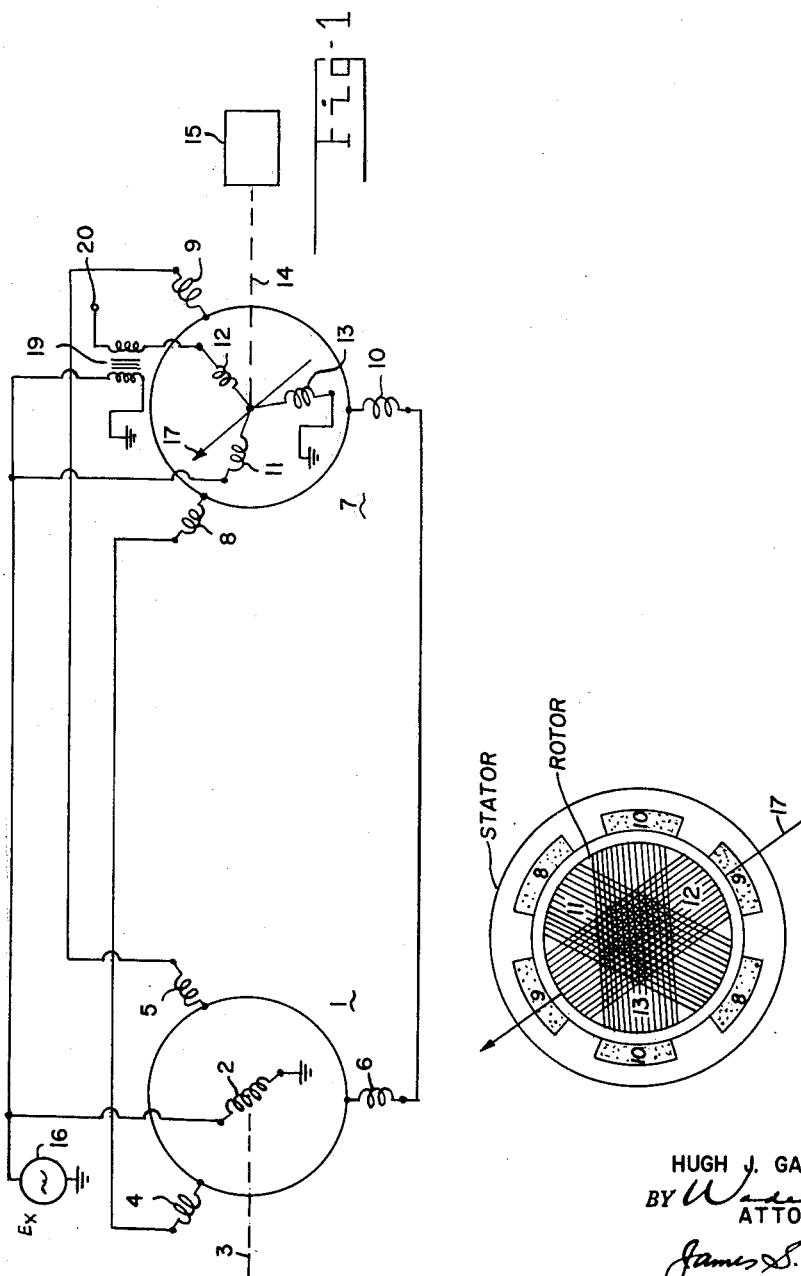
INVENTOR.
HUGH J. GALBRAITH
BY
ATTORNEY
AGENT United States Patent Office 3,068,385
Patented Dec. 11, 1962

3,068,385
COMBINATION SYNCHRO MOTOR AND TORQUE MEASURING DEVICE
Hugh J. Galbraith, Riverside, Calif., assignor to the United States of America as represented by the Secretary of the Air Force
Filed Sept. 13, 1960, Ser. No. 55,810
2 Claims. (Cl. 318—24)
(Granted under Title 35, U.S. Code (1952), sec. 266)

The invention described herein may be manufactured and used by or for the United States Government for governmental purposes without payment to me of any royalty thereon.

In synchro systems as used in various types of analog computers it is frequently necessary to have a measure of the torque exerted by a synchro motor against its load as well as a measure of the magnitude and direction of the error in angular position of the synchro motor shaft. Customarily this information would be obtained by the use of a synchro control transformer in conjunction with the synchro motor. This is undesirable both from the standpoint of increasing the load on the motor and the necessity for using an additional synchro, the control transformer, which is a relatively expensive item.

This invention relates to synchro systems of the type in which the synchros have three stator windings 120° apart and has as its purpose the provision of means whereby a single synchro differential having Y-connected rotor windings may be used to perform both the shaft positioning function of a synchro motor and the torque and error signal generating function of a control transformer, thus permitting a single synchro unit to be employed where two synchro units were formerly required. Briefly this is accomplished by applying a constant energization, from the source supplying the synchro generator rotor winding, to two of the synchro differential rotor windings in series and utilizing the third rotor winding in the generation of the error signal. The manner of doing this will be explained more fully with reference to the specific embodiment of the invention shown in the accompanying drawing, in which FIG. 1 illustrates a synchro system embodying the invention; and FIG. 2 illustrates the physical relationships of the windings of a synchro differential.

Referring to FIG. 1, the numeral 1 designates a synchro generator having a rotor winding 2 mounted on shaft 3, which shaft constitutes the input to the synchro system, and stator windings 4, 5 and 6. The reference numeral 7 designates a synchro differential having stator windings 8, 9 and 10 and rotor windings 11, 12 and 13. The rotor shaft is designated by numeral 14 and constitutes the output of the synchro system. The shaft may be coupled to any device 15 which it is desired to angularly position in accordance with input shaft 3. Rotor winding 2 of synchro generator 1 is energized by connecting it across alternating current source 16. The stator windings of the synchro generator are connected to the corresponding stator windings of the synchro differential in conventional manner.

Standard synchro generators, motors and differentials are adequately described in the literature, for example, Components Handbook—Blackburn, Radiation Laboratory Series, Volume 17, First Edition, 1949, McGraw-Hill Book Company, Inc. The synchro differential 7 is caused to operate like a synchro motor, which has a single stator winding, by connecting two of its three rotor windings so that they are the equivalent of a single winding and energizing the combined windings in the same manner as the single rotor winding of a synchro motor. Thus, as shown in FIG. 1, windings 11 and 13 are connected in series across source 16. FIG. 2 is a simplified showing of the stator and rotor windings of a standard synchro differential that gives a better illustration of their physical relationships than is given in FIG. 1. The rotor windings in FIG. 2 have the same angular relationships to the stator windings that they have in FIG. 1. It will be seen in FIG. 2 that the axes of all windings pass through the rotor axis. It will also be seen that the axis of symmetry of windings 11 and 13 is the line 17 which passes through the rotor axis. Line 17 is also the axis of symmetry of the magnetic flux produced by windings 11 and 13 when they are connected in series across source 16, as shown in FIG. 1. As in a synchro motor, which has a single rotor winding, the angular position of the coil and flux axis of symmetry with respect to the rotor structure and output shaft is fixed. It is therefore seen that the rotor of synchro differential 7, with coils 11 and 13 energized in the manner shown, is the equivalent of the rotor of an ordinary synchro motor.

In a conventional synchro system in which a synchro generator is connected to a synchro motor, the rotor of the motor tends to assume an angular position such that the motor rotor winding axis has the same relation to the motor stator windings that the generator rotor winding axis has to the generator stator windings. When the position of the rotor relative to the stator is exactly the same in the two synchros, equal voltages are induced in the corresponding stator windings and, since these voltages buck each other, the currents in the windings and in the three lines connecting the corresponding stator windings of the two synchros are zero. The torques on the synchro rotors under this condition are zero. When the motor and generator rotor positions relative to their stator windings are not the same, the voltages induced in the corresponding stator windings of the two synchros are not equal and resultant currents flow in the stator windings. These currents produce equal torques on the rotors of both synchros in such directions as to bring them into angular alignment. However, since the angular position of the generator rotor is usually fixed by the input shaft, all of the rotation necessary to bring the two synchros into angular alignment takes place at the motor. As stated above, the torque on the motor rotor is zero when its angular position relative to the stator windings is the same as that of the generator rotor relative to its stator windings. When displaced from this position of angular alignment the restoring torque on the rotor is proportional to the displacement over a wide range, as shown in FIG. 10·15 on page 329 of the above cited Components Handbook.

The system of FIG. 1 operates in exactly the same manner as the conventional system described above. As already explained, the rotor of synchro differential 7, with windings 11 and 13 energized as shown in FIG. 1, is the equivalent of the rotor of a synchro motor. Therefore, the axis 17 of coils 11 and 13 tends to asume the same angular position relative to the stator windings 8, 9 and 10 that the axis of generator rotor winding 2 has with respect to stator windings 4, 5 and 6. As was noted in the conventional system above, when the two synchros are in perfect angular alignment the voltages induced in corresponding stator windings are equal and of the same phase so that the current in the corresponding windings and the interconnecting line is zero. This means that the coupling between the rotor winding and stator windings is the same for the generator and the motor. This situation is also substantially true for the system of FIG. 1 as shown by the following considerations: The maximum voltage induced in a stator winding of a standard synchro generator by the flux produced by the rotor winding is slightly less than ½ the voltage across the rotor winding. A standard synchro differential such as 7, is designed so that the maximum voltage induced in a rotor winding by the flux produced by a stator winding is exactly equal to the stator winding voltage, or, in other words, the maximum voltage ratio in this direction is 1/1. In order to obtain a 1/1 voltage ratio from stator to rotor it is necessary that the rotor winding have a few more turns than the stator winding to compensate for the imperfect coupling between the windings. Therefore, the turns ratio from rotor to stator is less than 1/1. Further, since two rotor windings are connected in series in FIG. 1, the turns ratio of the combined windings to a stator winding is less than 2/1. Therefore, the maximum voltage induced in a stator winding of synchro differential 7 is less than ½ the voltage of source 16 and substantially equal to the maximum voltage induced in a stator winding of synchro generator 1. The only effect of a slight inequality is a small residual current flow in the stator windings when the system is perfectly aligned. The induced stator voltages may be made equal and the residual currents reduced to zero if desired by an appropriate adjustment of the rotor energization of either synchro, using any suitable means such as a transformer.

With the synchro differential connected as shown in FIG. 1, the torque characteristic of its rotor is similar to that of a synchro motor shown in FIG. 10·15 on page 329 of the above cited Components Handbook. When axis 17 has exactly the same angular position as the axis of coil 2 of the synchro generator, the torque on the rotor of synchro differential 7 is zero. If the rotor of synchro 7 is displaced from this position the torque exerted on it is proportional to the displacement over a wide range. Consequently, any method of sensing the amount and direction of the rotor displacement can be used to give an indication of the magnitude and the direction of the torque on the rotor.

In the system shown in FIG. 1 the third winding 12 of the synchro differential rotor is used for the above purpose. The net coupling between this winding and series connected windings 11 and 13 is zero. This is apparent from FIG. 2 where it is seen that the coupling between winding 11 and winding 12 is equal and opposite in phase to the coupling between winding 13 and winding 12, so that the net coupling is zero. Looked at in another way, the axis of symmetry 17 of windings 11 and 13 and of the flux produced by these windings is at right angles to the axis of winding 12, so that the flux induces no voltage in winding 12. If, as mentioned above, the rotor winding energizations are such that the maximum voltages induced in the stator windings of the two synchros 1 and 7 are equal, the currents in the stator windings of both synchros are zero when the axis 17 has exactly the same angular position as the axis of rotor winding 2 of synchro generator 1. Under this condition, the only flux in syncho 7 is that produced by windings 11 and 13 and, therefore, no voltage is induced in winding 12. This is also true when the rotor energizations are such that the maximum voltages induced in the stator windings of the two synchros are not exactly equal. In this case, the residual currents flowing in windings 8, 9 and 10 produce an additional flux in synchro 7 which, however, is aligned with axis 17 and therefore induces no voltage in winding 12. Consequently, when axis 17 has exactly the same angular position as the axis of winding 2 the voltage induced in winding 12 is zero.

When the rotor of synchor 7 is displaced from the above described position of angular alignment with the rotor of synchro 1, the currents in the stator windings are no longer zero, or at their residual values, but have changed by amounts depending upon the displacement of the rotor of synchro 7 from the aligned or zero position. These currents produce a torque on the rotor of synchro 7 tending to return it to its zero position. As already pointed out, this torque is proportional to the displacement. The new values of current in the stator windings produce an additional flux which is not in alignment with axis 17 and therefore not at right angles to winding 12. Consequently, this component of the total flux induces a voltage in winding 12 the magnitude of which is directly related to the displacement of the rotor from its zero position and the phase of which is indicative of the direction of the displacement. Since, as already pointed out, the rotor torque is proportional to the rotor displacement, the voltage induced in winding 12 is directly related to the rotor torque and its phase, relative to the phase of source 16, indicates the direction of the torque. The voltage induced in winding 12 is therefore a measure of the rotor displacement error and of the rotor torque.

In order to sense this voltage it is necessary to connect winding 12 in an external circuit. In FIG. 1 the terminals for the external circuit are terminal 20 and ground. Because of the manner in which the synchro differential is constructed, it is necessary that winding 13 be included in the external circuit. As shown above, the voltage induced in winding 12 is zero when the rotor of synchro 7 is in its zero position. It is desirable that the voltage at terminal 20 be zero under this condition. However, it is apparent from FIG. 1 that a voltage exists across coil 13 due to its energization from source 16 and that this voltage appears at terminal 20. Therefore, in order to reduce the voltage at terminal 20 to zero when the rotor of synchro 7 is in its zero error position, transformer 19 is provided to introduce a constant alternating voltage in series with terminal 20 that is equal to and of opposite phase relative to the voltage across winding 13 when the rotor is in its zero error position. This transformer is energized from source 16 and has the turns ratio necessary to supply the required cancelling voltage across its secondary terminals. With this arrangement, the voltage at terminal 20 is zero when the displacement error is zero and increases on either side of the zero position in direct relation to the displacement error. The phase of the voltage at terminal 20 reverses at the zero error position of the rotor, thus giving an indication of the direction of the displacement error. As already stated, since torque is directly proportional to displacement, this voltage also is directly related to torque and indicates the torque direction by its phase.

I claim:

1. A combined synchro motor and torque measuring device comprising: a synchro having three stator windings for receiving synchro input currents and three Y-connected rotor windings, the free ends of said rotor windings providing first, second and third rotor winding terminals; means for applying a constant alternating voltage between said first and third terminals; a torque measuring signal output terminal; and a transformer having its primary winding connected between said first and third terminals and its secondary winding connected between said output terminal and said second terminal.

2. A synchro system comprising: a synchro generator having a rotor winding and three stator windings; a synchro differential having three stator windings and three Y-connected rotor windings, the free ends of said rotor windings providing first, second and third rotor winding terminals; a source of constant voltage alternating current; means connecting the rotor winding of said synchro generator across said source; means connecting said source between the said first and third terminals of said synchro differential rotor windings; means connecting the stator windings of said synchro generator to the stator windings of said synchro differential; a torque measuring signal output terminal; and a transformer having its primary winding connected across said source and its secondary winding connected between said output terminal and the said second terminal of said synchro differential rotor windings, said transformer being poled so that the phase of its secondary voltage is opposite to that of the voltage between the said second and third terminals of said synchro differential rotor windings and the magnitude of said secondary voltage being equal to the magnitude of the voltage between said second and third terminals when said synchro differential rotor windings are in their zero angular displacement error position.

References Cited in the file of this patent
UNITED STATES PATENTS 2,880,388  Book et al. _____ Mar. 31, 1959
2,950,616  Boomquist et al. _____ Aug. 30, 1960

OTHER REFERENCES

Laver, Lesnick, Matson: Servomechanism Fundamentals, page 34, figures 2·13, 2·14; McGraw-Hill, New York, 1947 (Div. 26).